United States Patent
Inomata et al.

(10) Patent No.: US 6,839,857 B2
(45) Date of Patent: Jan. 4, 2005

(54) INTERRUPT CONTROLLER IN AN INTERFACE DEVICE OR INFORMATION PROCESSING SYSTEM

(75) Inventors: Yuichi Inomata, Tokyo (JP); Yasuyuki Yamamoto, Kawasaki (JP)

(73) Assignee: Sony Computer Entertainment Inc., Tokyo (JP)

( * ) Notice: Subject to any disclaimer, the term of this patent is extended or adjusted under 35 U.S.C. 154(b) by 392 days.

(21) Appl. No.: 09/758,108

(22) Filed: Jan. 10, 2001

(65) Prior Publication Data

US 2001/0027533 A1 Oct. 4, 2001

(30) Foreign Application Priority Data

Jan. 13, 2000 (JP) ........................................ 2000-004878
Jan. 10, 2001 (JP) ........................................ 2001-002697

(51) Int. Cl.[7] ............................ G06F 1/12; G06F 13/42; H04L 5/00
(52) U.S. Cl. ........................ 713/400; 710/262; 710/306; 710/301; 710/49
(58) Field of Search ........................ 710/260–269, 710/300–306, 48–49, 104–105, 8–11, 15–17, 310–315; 713/400, 600–601; 714/55–56

(56) References Cited

U.S. PATENT DOCUMENTS

| | | | | |
|---|---|---|---|---|
| 4,999,787 A | * | 3/1991 | McNally et al. | 710/302 |
| 5,310,998 A | * | 5/1994 | Okuno | 235/380 |
| 5,519,851 A | | 5/1996 | Bender et al. | |
| 5,530,906 A | * | 6/1996 | Cho et al. | 710/72 |
| 5,797,020 A | * | 8/1998 | Bonella et al. | 710/263 |
| 5,822,547 A | * | 10/1998 | Boesch et al. | 710/302 |
| 5,881,251 A | * | 3/1999 | Fung et al. | 710/304 |
| 6,041,375 A | * | 3/2000 | Bass et al. | 710/302 |
| 6,061,752 A | * | 5/2000 | Jones et al. | 710/302 |
| 6,062,480 A | * | 5/2000 | Evoy | 710/302 |
| 6,098,132 A | * | 8/2000 | Olarig et al. | 710/302 |
| 6,189,050 B1 | * | 2/2001 | Sakarda | 710/18 |
| 6,418,492 B1 | * | 7/2002 | Papa et al. | 710/302 |
| 6,477,596 B2 | * | 11/2002 | Miura et al. | 710/107 |
| 6,487,623 B1 | * | 11/2002 | Emerson et al. | 710/302 |
| 6,594,720 B1 | * | 7/2003 | Matsui et al. | 710/301 |
| 6,633,942 B1 | * | 10/2003 | Balasubramanian | 710/264 |

FOREIGN PATENT DOCUMENTS

| | | |
|---|---|---|
| EP | 0537899 | 4/1993 |
| EP | 0 672 987 | 3/1995 |
| JP | 64-21440 | 2/1989 |
| JP | 2-56043 | 2/1990 |
| JP | 4-219847 | 8/1992 |
| JP | 6-68015 | 3/1994 |
| JP | 6236329 | 8/1994 |
| JP | 6324957 | 11/1994 |
| JP | 7-191917 | 7/1995 |
| JP | 7311718 | 11/1995 |
| JP | 8036539 | 2/1996 |
| JP | 10-207811 | 8/1998 |

* cited by examiner

*Primary Examiner*—Paul R. Myers
*Assistant Examiner*—Raymond N Phan
(74) *Attorney, Agent, or Firm*—Katten Muchin Zavis Rosenman

(57) ABSTRACT

There is disclosed an interface device which can prevent the freezing of an information processing system caused occupation of a system bus even when a wait signal outputted from the PC card is kept asserted. When the wait signal outputted from the PC card, is asserted, a timer portion 201 is activated. When the timer portion 201 detects that the wait signal is kept asserted for more than a predetermined period of time, it asserts a wait mask signal. Upon assertion of the wait mask signal, a mask portion 202 masks the wait signal from the PC card so that the wait signal to the CPU is negated even when the wait signal is kept asserted. Further, when the timer portion 201 asserts the wait mask signal, an interrupt control block/card status register 210 asserts an interrupt signal to the CPU.

5 Claims, 3 Drawing Sheets

INTERRUPT CONTROLLER IN AN INTERFACE DEVICE OR INFORMATION PROCESSING SYSTEM

This application claims a priority based on Japanese Patent Applications No. 2000-4878 and No. 2001-2697 filed on Jan. 13, 2000, and Jan. 10, 2001, the entire contents of which are incorporated herein by reference for all purposes.

BACKGROUND OF THE INVENTION

1. Technical Field

The present invention relates to an interface device and an information processing system provided therewith. The interface device establishes an interface between a CPU and an external unit such as a PC card.

2. Background Arts

As one kind of external units of a computer, there is known a card of the PCMCIA (Personal Computer Memory Card International Association) standard (hereinafter referred to as a PC card). As examples of the PC card, there are given a memory card incorporating a memory therein and various kinds of I/O cards which function as input/output interfaces. Further examples of such I/O cards include a modem card and a SCSI card.

As one of various kinds of signals outputted from such PC cards there is a wait signal (WAIT). The PC card functions such that it asserts such wait signal in the case that the bus cycle is desired to be extended by delaying the termination of the access cycle when it is accessed by CPU and the like.

However, it is usual that when the PC card asserts a wait signal, the PC card occupies the bus of the system during the assertion. Therefore, where the PC card continues to assert the wait signal due to a failure or other reasons, the bus of the system is kept occupied by the PC card. As a result, the system becomes frozen.

DISCLOSURE OF THE INVENTION

An object of the present invention is to prevent freezing of an information processing system caused by occupation of a system bus when a wait signal is kept asserted.

The interface device according to the present invention is a device that establishes an interface between a CPU and an external unit such as a PC card.

The interface device according to the present invention is provided with a timer portion, a mask portion and an interrupt generating portion. The timer portion operates such that when it detects that a wait signal (WAIT) outputted from the external unit has been kept asserted for more than a predetermined period of time, it asserts a mask signal (MASK). The mask portion operates such that when the MASK signal is asserted, it masks the WAIT signal and outputs the wait signal to the CPU. Further, the interrupt portion operates such that when the mask signal is asserted, it issues an interrupt signal to the CPU.

Further, the information processing system according to the present invention is provided with a CPU and an interface device for establishing an interface between the CPU and an external unit. Further, the interface device operates such that when it detects that a wait signal outputted from the external unit has been asserted for more than a predetermined period of time, it outputs a negated wait signal to the CPU and simultaneously therewith, it issues an interrupt signal to the CPU.

In the above case, the interface device may be so constructed that it is provided with a timer portion, a mask portion and an interrupt-controlling portion. The timer portion is activated when a wait signal outputted from the external unit is asserted and asserts a mask signal when the wait signal continues to be asserted for more than a predetermined period of time; the mask portion masks the wait signal and outputs a mask signal to the CPU when the mask signal is asserted; and the interrupt portion may be so formed that when the mask signal is asserted, it issues an interrupt signal to the CPU.

Further, the CPU may be so formed that when it detects an interrupt signal, it performs a recovering process of the external unit.

BRIEF DESCRPTION OF THE DRAWINGS

BEST MODE FOR CARRYING OUT THE INVENTION

An embodiment of the present invention will now be described in detail with reference to the accompanying drawings.

Figure 1:
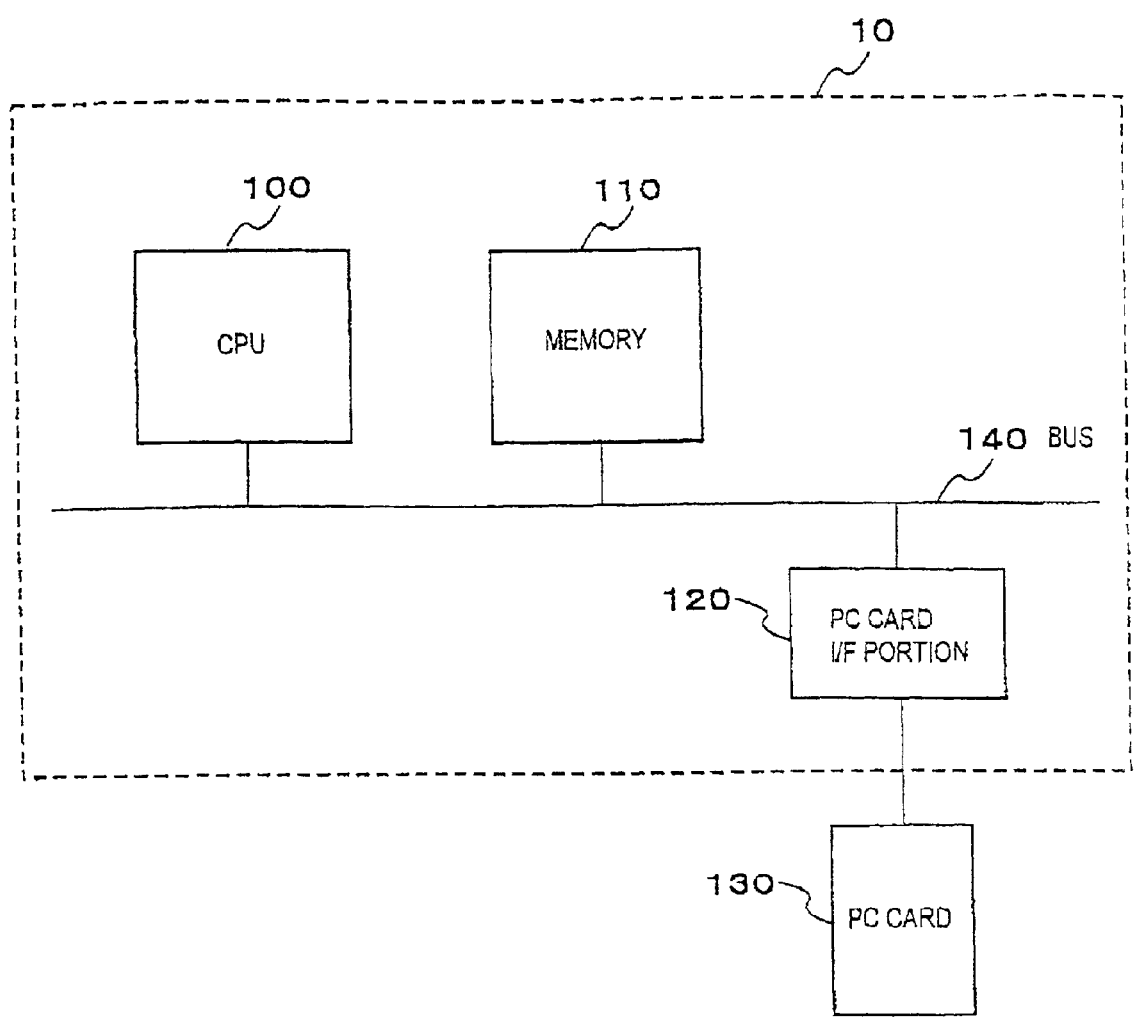
FIG. 1 is a diagram showing a configuration of an information processing system according to the present invention.

FIG. 1 shows a configuration of an information processing system to which the present invention is applied. The information processing system functions, for example, as an entertainment apparatus for carrying out a video game and the like.

As shown in FIG. 1, the information processing system 10 comprises a CPU 100, a memory 110 and a PC card interface portion 120 which each are connected to a bus 140. Further, the PC card interface portion 120 is connected with a PC card 130. FIG. 1 shows a state in which the PC card 130 is connected to the PC card interface portion 120. The connection of the PC card 130 to the PC card interface portion 120 is made removable as shown in FIG. 3.

Figure 3:
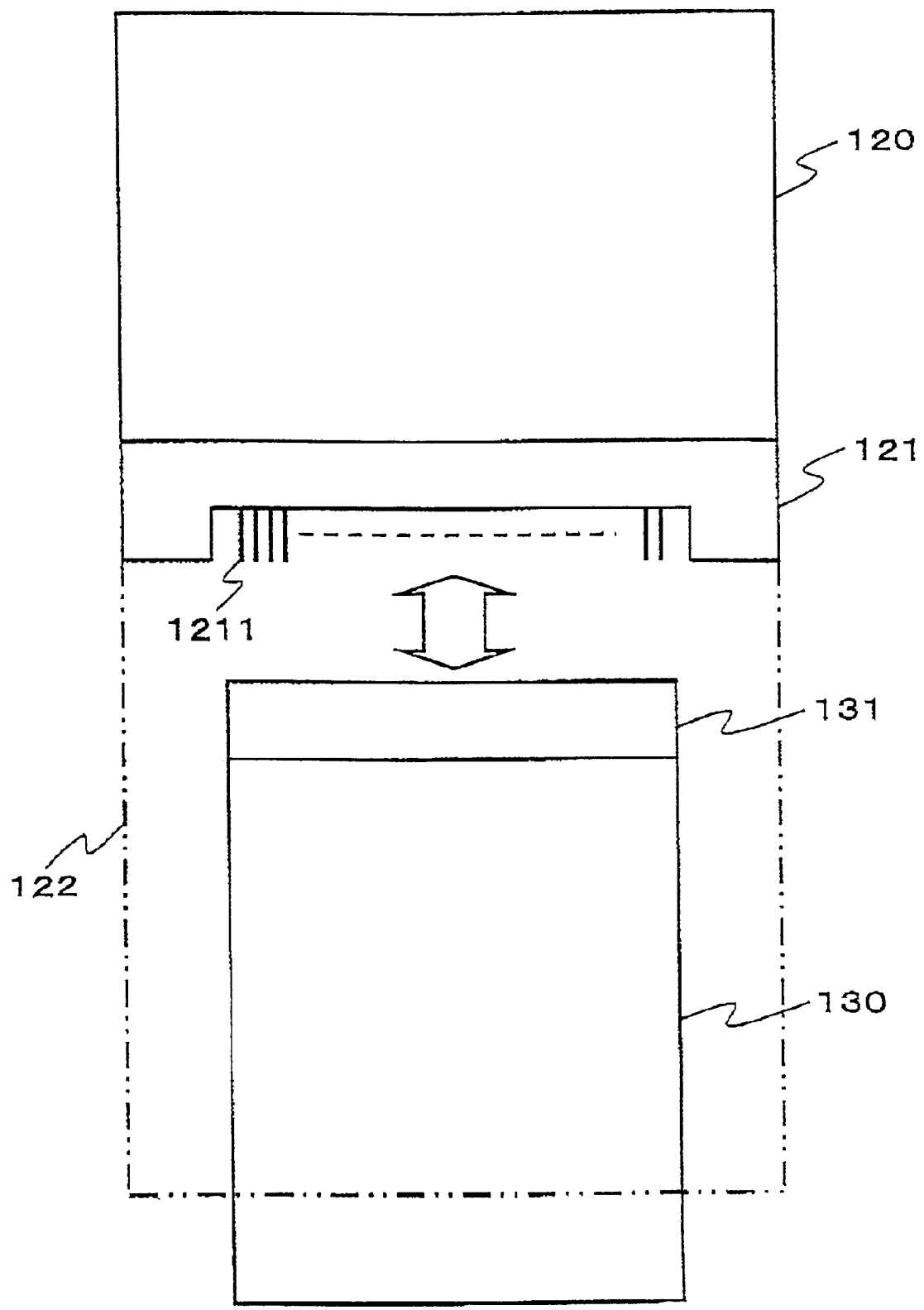
FIG. 3 is a diagram illustrating connection between a PC card interface portion and a PC.

Further, as shown in FIG. 3, the PC card 130 is constructed in the form of a card. It is provided with a connector portion 131 to be connected to the PC card interface portion 120 at one end thereof. In the PC card, circuit elements suitable for application of each card as described hereinbefore are incorporated therein. For example, there are incorporated within the PC card such circuit elements as a memory, an input/output interface circuit, a magnetic recording device, a wire communication device, a radio communication device, a receiver such as a radio and a storage device containing the contents of a dictionary or the like.

The CPU 100 controls the information processing system 10 in its entireties by executing program stored in the memory 110. Further, If necessary, the CPU 100 makes access to the PC card 130 through the PC card interface portion 120.

Figure 2:
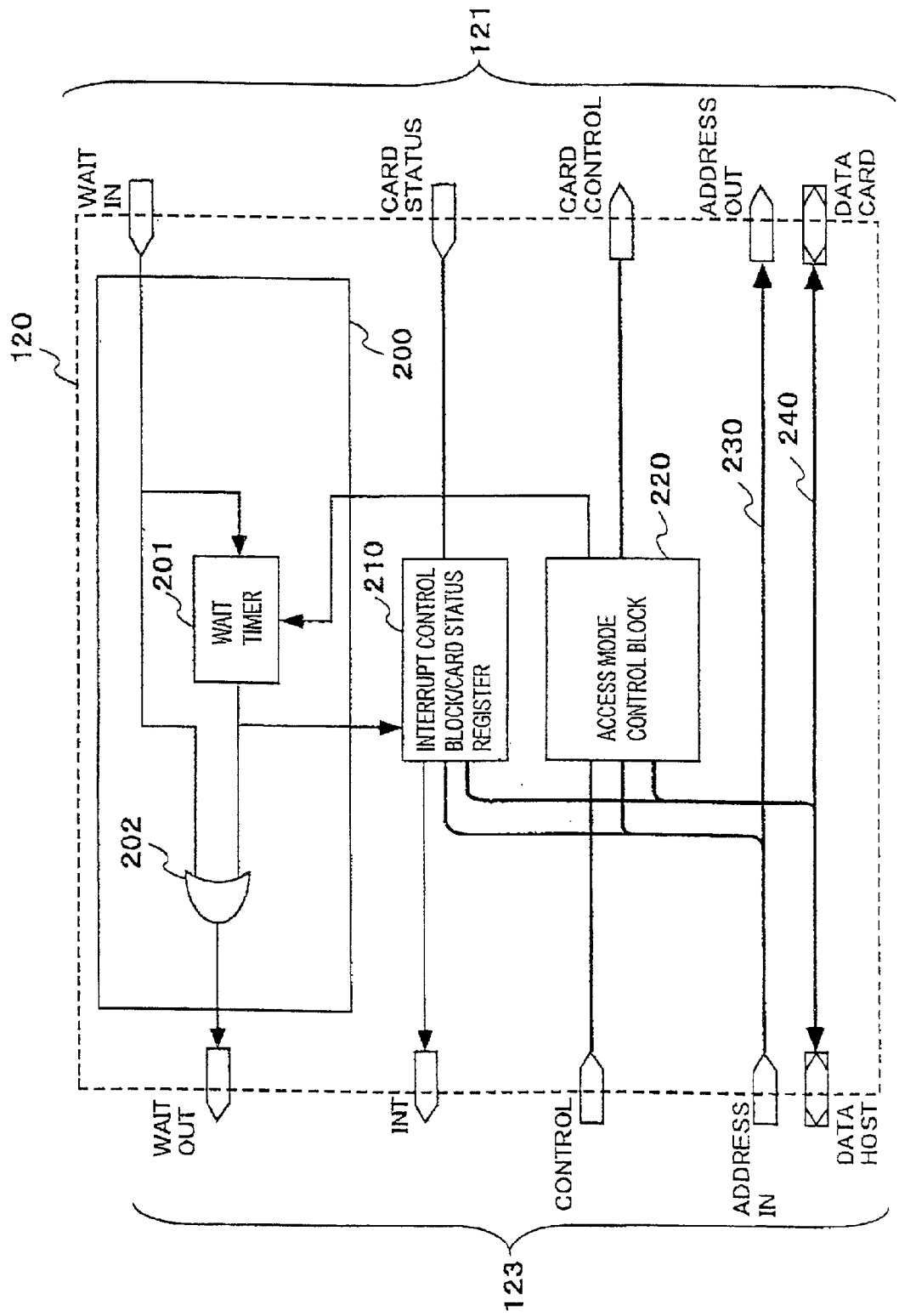
FIG. 2 is a diagram showing an internal structure of a PC card interface portion 120.

The PC card interface portion 120 is a circuit for establishing an interface so as to allow the CPU 100 to make an access to the PC card 130 for such as reading and writing. As shown in FIG. 2, the PC card interface portion 120 comprises a circuit portion for performing signal processing and signal transmission, a connector portion 121 for establishing connection to the PC card 130 and a connecting portion 123 for establishing connection to the bus 140, The circuit portion is realized in the form of a semiconductor integrated circuit, more concretely, in the form of LSI (Large-scale integration).

Next, the PC card interface portion 120 will be described in more detail with reference to FIGS. 2 and 3.

FIG. 2 is a diagram showing the internal configuration of the PC card interface portion 120. As shown in FIG. 2, the PC card interface portion 120 is provided, as the circuit portion described above, with a wait signal control block 200, an interrupt control block/card status register 210 and an access mode control block 220. Further, there are provided signal wirings 230 and 240 for the transmission of addresses and data, respectively, between the bus 140 and the PC card 130.

Further, the PC card interface portion 120 is provided with the connector portion 121 to be connected to a connector portion 131 (refer to FIG. 3) of the PC card 130 and the connecting portion 123 to be connected to the bus 140 (refer to FIG. 1). As shown in FIG. 3, the connector portion 121 has a plurality of pins 1211. The pins 1211 are assigned for a PC card status signal (CARD STATUS), a PC card control signal (CARD CONTROL), a wait signal (WAIT IN), an address signal (ADDRESS OUT) and a data signal (DATA CARD) from the PC card 130, respectively. Further, the connector portion 121 is arranged at the bottom of a card slot 122 for accommodating the PC card 130.

Further, the connecting portion 123 is provided with a plurality of terminals which are also assigned for a wait signal (WAIT OUT), an interrupt signal (INT), a PC card control signal (CONTROL) sent from the bus 140, an address signal (ADDRESS IN) sent from the information processing system, and a data host signal (DATA HOST) to be transmitted between the connecting portion 123 and the bus 140.

The interrupt control block/card status register 210 controls an interruption to the CPU 100 and also indicates the status of the PC card 130. In other words, the register 210 functions as an interrupt-controlling portion. To this register 210 are inputted the PC card status signals (CARD STATUS) outputted from the PC card 130. The PC card status signals (CARD STATUS) are signals indicating the status of the PC card 130. Examples thereof include an interrupt request signal (INTR#) and a card detecting signal (CD1#, CD2#). It should be noted that the marking "#" added to the end of each of the signal names indicates that the signal concerned is active low.

The access mode control block 220 controls an access from the CPU 100 to the PC card 130. This block 220 outputs a PC card control signal (CARD CONTROL) for controlling access to the PC card 130. Examples of the PC card control signals include card enable signals (CE1#, CE2#), a write enable signal (WE#), an output enable signal (OE#), an I/O read signal (IORD#), an I/O write signal (IOWR#) and a reset signal (RESET).

The wait signal control block 200 comprises a timer portion 201 and a mask portion 202, wherein, if necessary, the block 200 masks the watt signal (WAIT IN) outputted from the PC card 130 and outputs it to the CPU 100.

To the timer portion 201 is inputted a wait signal (WAIT#) outputted from the PC card 130. Further, the timer portion 201 outputs a wait mask signal to the mask portion 202. It is noted that the wait signal is an active low signal and the wait mask signal is an active high signal.

When the watt signal is asserted, the timer portion 201 starts its time measuring operation and in case where the wait signal continues to be asserted even after a lapse of a predetermined period of time, it asserts a wait mask signal. In this case, when the wait signal is negated prior to the lapse of the predetermined period of time, the timer portion 201 stops its time measuring operation. Then, when the wait signal is asserted again, the timer portion 201 starts its time measuring operation from the beginning. The predetermined period of time for regulating the timing of asserting the wait mask signal is selected to a suitable value depending on the mounting condition of the system. Note that the asserted wait mask signal can be negated, for example, when the CPU 100 makes an access to a predetermined register. Further, the operation of the timer portion 201 can also be "enabled/disabled" when the CPU 100 makes an access to a predetermined register.

The mask portion 202 masks the wait signal (WAIT#) outputted from the PC card 130 according to a wait mask signal outputted from the timer portion 201 and outputs it to the CPU 100. In this case, the mask portion 202 is formed of an OR circuit with 2 input terminals such that the wait signal from the PC card 130 is inputted to one of the 2 input terminals of the OR circuit and the wait mask signal from the timer portion 201 is inputted to the other input terminal of the OR circuit. That is, when the wait mask signal goes to a high level ("1"), the high-level wait signal (negated wait signal) is outputted to the CPU 100 irrespective of the wait signal outputted from the PC card 130.

The wait mask signal outputted from the timer portion 201 is inputted also to the interrupt control block/card status register 210. When the wait mask signal is asserted, the interrupt control block/card status register 210 asserts an interrupt signal to the CPU 100.

Next, the operation of the PC card interface portion 120 having the above-described configuration will now be described. It should be noted in this case that the PC card 130 is connected to the PC card interface portion 120.

First, when the CPU 100 makes an access to the PC card 130 through the PC card interface portion 120, the PC card 130 asserts a wait signal as required.

Thus, when the wait signal is asserted, the timer portion 201 is activated to start its time measuring operation, Then, when a predetermined period of time has lapsed while the wait signal is kept asserted, a wait mask signal is asserted by the timer portion 201. In this case, where the wait signal is negated prior to a lapse of the predetermined period of time, the timer portion 201 stops its time measuring operation and upon re-assertion of the wait signal, it starts its time measuring operation from the beginning.

When a predetermined period of time has lapsed while the wait signal is kept asserted, and then the timer portion 201 asserts the wait mask, the wait signal from the PC card 130 is masked at the mask portion 202 and the wait signal to the CPU 100 is negated even when the wait signal from the PC card 130 is kept asserted.

Further, when the timer portion 201 asserts the wait mask signal, the interrupt control block/card status register 210 asserts the interrupt signal to the CPU 100, Upon reception of the interrupt signal issued by the interrupt control block/card status register 210, the CPU 100 executes an interrupting process. In such interrupting process, the CPU 100 determines a cause of interruption. Then, if it judges that the interruption is due to the fact that the wait signal from the PC card 130 has been kept asserted for more than a predetermined period of time, the CPU 100 performs a necessary recovering process. For example, it re-executes an I/O process after resetting the PC card 130. However, if recovery cannot be made even after executing such recovering process, the defect of the PC card 130 is informed to a user by displaying an error message.

As described above in detail, It is possible according to the present invention to prevent the freezing of the system resulting from the system bus being kept occupied even when the wait signal is kept asserted, for instance, due to a PC card failure.

What is claimed is:

1. An interface device for establishing an interface between a CPU and an external unit, comprising:

a timer portion, a mask portion, and an interrupt controlling portion, wherein:

said timer portion asserts a mask signal when detecting that a wait signal outputted from said external unit is kept asserted for more than a predetermined period of time, said mask portion masks said wait signal and outputs it to said CPU when said mask signal is asserted; and said interrupt controlling portion issues an interrupt signal to said CPU when said mask signal is asserted.

2. An information processing system comprising a CPU and an interface device for establishing an interface between said CPU and an external unit, wherein:

when said interface device detects that a wait signal outputted from said external unit has been kept asserted for more than a predetermined period of time, said interface device masks the wait signal for outputting to said CPU and issues an interrupt signal to said CPU to prevent freezing of the information processing system caused by occupation of a bus of the information processing system when said wait signal has been kept asserted.

3. An information processing system according to claim 2, wherein said interface device includes a timer portion, a mask portion and an interrupt controlling portion, wherein said timer portion is activated when the wait signal outputted from said external unit is asserted, and then asserts a mask signal when said wait signal is kept asserted for more than a predetermined period of time;

said mask portion masks said wait signal for outputting to said CPU when said mask signal is asserted; and said interrupt controlling portion issues an interrupt signal to said CPU when said mask signal is asserted.

4. An information processing system according to claim 3, wherein said CPU detects said interrupt signal thereby to recover said external unit.

5. An information processing system according to claim 2, wherein said CPU detects said interrupt signal thereby to recover said external unit.

* * * * *